United States Patent [19]

Nagatsuka et al.

[11] Patent Number: 5,151,947
[45] Date of Patent: Sep. 29, 1992

[54] METHOD AND APPARATUS FOR PROCESSING RADIATION IMAGE

[75] Inventors: Sumiya Nagatsuka; Hiroshi Takeuchi; Haruo Karasawa, all of Hino, Japan

[73] Assignee: Konica Corporation, Tokyo, Japan

[21] Appl. No.: 617,602

[22] Filed: Nov. 26, 1990

[30] Foreign Application Priority Data

Nov. 28, 1989 [JP] Japan .................................. 1-306462
Oct. 17, 1990 [JP] Japan .................................. 2-276484

[51] Int. Cl.⁵ ............................................... G06K 9/00
[52] U.S. Cl. ..................................... 382/6; 364/413.15; 364/413.22; 382/18
[58] Field of Search ................... 382/6, 48, 18, 51, 54; 358/111; 364/413.13, 413.14, 413.15, 413.16, 413.19, 413.22, 413.23; 378/4, 62

[56] References Cited

U.S. PATENT DOCUMENTS

| 4,302,672 | 11/1981 | Kato et al. | 382/6 |
|---|---|---|---|
| 4,317,179 | 2/1982 | Kato et al. | 382/6 |
| 4,533,947 | 8/1985 | Smith | 382/6 |
| 4,851,984 | 7/1989 | Doi et al. | 364/413.23 |
| 4,870,694 | 9/1989 | Takeo | 382/6 |
| 4,896,279 | 1/1990 | Yoshida | 382/18 |
| 4,907,156 | 3/1990 | Doi et al. | 382/6 |
| 4,922,915 | 5/1990 | Arnold et al. | 382/6 |
| 4,975,970 | 12/1990 | Zettel et al. | 382/18 |

FOREIGN PATENT DOCUMENTS 63-31641  2/1988 Japan .
1-33818  7/1988 Japan .

Primary Examiner—Joseph Mancuso
Attorney, Agent, or Firm—Finnegan, Henderson, Farabow, Garrett & Dunner

[57] ABSTRACT

Entire data of a radiation image formed by irradiating a subject with radiations are analyzed to determine a desired image region, gradation processing conditions are determined based on image data within the desired image region, and the radiation image is subjected to the gradation processing under the determined gradation processing conditions.

6 Claims, 6 Drawing Sheets

METHOD AND APPARATUS FOR PROCESSING RADIATION IMAGE

BACKGROUND OF THE INVENTION

(1) Field of the Invention

The present invention relates to a method and apparatus for processing a radiation image formed by the photographing using radiations such as X-rays and γ-rays.

(2) Description of the Related Art

If a radiation image is digitized and is connected through a network, processing, transmission, storage and retrieval of the image become possible, and the diagnosis by a doctor is facilitated. However, a radiation image having a high diagnosis performance is required. Furthermore, in order to increase the performance of the diagnosis by the doctor, the radiation image should be subjected to an appropriate image processing, and among such image processings, a gradation processing is simple and a high effect is attained by this treatment. The conventional image processing by the gradation processing will now be described.

When the radiation image is subjected to the gradation processing, the gradation processing conditions are determined from statistical characteristics of data of the entire image (maximum and minimum values of data, histograms and the like), and the gradation processing of the entire image is carried out under these conditions (see Japanese Examined Patent Publication No. 63-31641 and Japanese Unexamined Patent Publication No. 1-33818).

In the case where the radiation image is a chest image, only a part of the pulmonary region is necessary in the image. If the gradation processing conditions are determined based on the statistical characteristics of data including those of unnecessary portions, an optimum gradation processing cannot be attained and optimum data for the necessary portion cannot be obtained. If the irradiation area is limited to the pulmonary region, there appears a portion having data equivalent almost to zero, and if the gradation processing conditions are determined from the statistical characteristics of data including data of this portion, optimum gradation processing results cannot be obtained.

SUMMARY OF THE INVENTION

Under this background, it is a primary object of the present invention to secure optimum image data in a desired image region.

Another object of the present invention is to secure optimum image data even if an image error is present at a part of a radiation image.

In order to attain these objects, the present invention provides a method for processing a radiation image, in which entire data of the radiation image are analyzed to determine a desired image region, gradation processing conditions are determined from image data in the determined image region, and the radiation image is subjected to the gradation processing under the determined gradation processing conditions.

The image processing apparatus of the present invention comprises region-determining means for analyzing entire data of a radiation image and determining a desired image region, and gradation processing condition-determining means for determining gradation processing conditions based on the statistical characteristics of image data in the determined image region.

According to the present invention, the gradation processing conditions are determined from image data of a desired image region determined by analyzing entire data of a radiation image, and the gradation processing of the radiation image is carried out under the determined gradation processing conditions, whereby optimum image data in the desired image region can be secured.

There can be adopted a method in which the radiation image is projected from a predetermined direction and a desired image region is determined from the projection value. According to this method, even if an image error is present at a part of image data, the influence of the error is reduced so that an optimum image region is determined, and the time required for analyzing image data can be shortened. Preferably, the desired image region is determined based on the projection value and the threshold value, and in this case, a further optimum image region can be determined.

Moreover, there can be adopted a method in which a histogram is formed from image data in the desired image region and the gradation processing conditions are determined from this histogram. According to this method, even if an image error is present at a part of image data, optimum gradation processing conditions can be determined and an optimum gradation processing can be carried out.

The present invention will now be described in detail with reference to embodiments illustrated in the accompanying drawings.

DETAILED DESCRIPTION OF THE PREFERRED EMBODIMENTS

Figure 1:
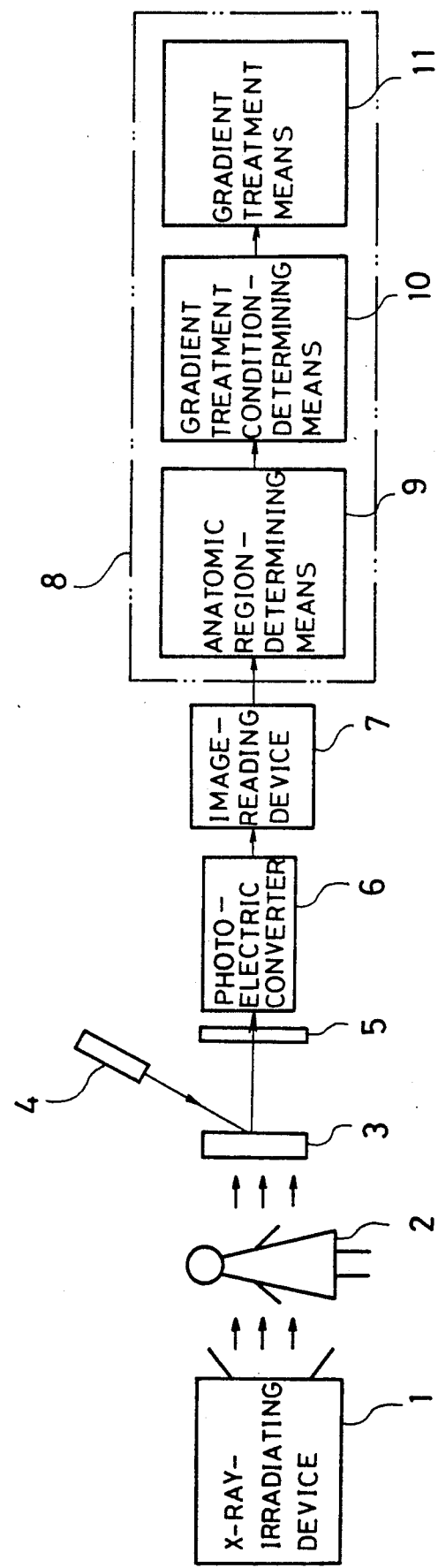
FIG. 1 is a block diagram illustrating a structure of one embodiment of the present invention.

Referring to FIG. 1, X-rays from an X-rays-irradiating device 1 comprising an X-ray tube permeate a subject 2, for example, a human body, and are transmitted to a radiation conversion panel 3. The radiation conversion panel 3 has an accelerated phosphor layer. If this phosphor is irradiated with exciting rays such as X-rays, electron beams and ultraviolet rays, a part of energy of the rays is accumulated according to the irradiation dose.

Thus, the radiation conversion panel 3 stores therein a latent image corresponding to the energy transmitted through the subject 2.

The radiation conversion panel 3 is irradiated in the scanning manner with accelerated exciting rays, such as visible rays or ultraviolet rays, emitted from an accelerated exciting ray source 4. By this irradiation, an accelerated fluorescence proportional to the accumulated energy is generated in the radiation conversion panel 3. This fluorescence is inputted in a photo-electric converter 6 through a filter 5. The photo-electric converter 6 converts an incident light to a voltage signal proportional to the luminous intensity and outputs this voltage signal to an image-reading device 7.

In the radiation conversion panel 3, photographing, reading and erasion can be performed repeatedly, and the recordable radiation exposure region is very broad and the difference of the photographing condition can be modified and compensated. Moreover, transmission processing of transmitting digital image data to a host computer, or digital image data can be recorded on a film and a reproduced image can be secured as a hard copy by developing the recorded image.

The image-reading device 7 converts the inputted voltage signal to digital image data and outputs the digital image data to an image-processing device 8.

Figure 2:
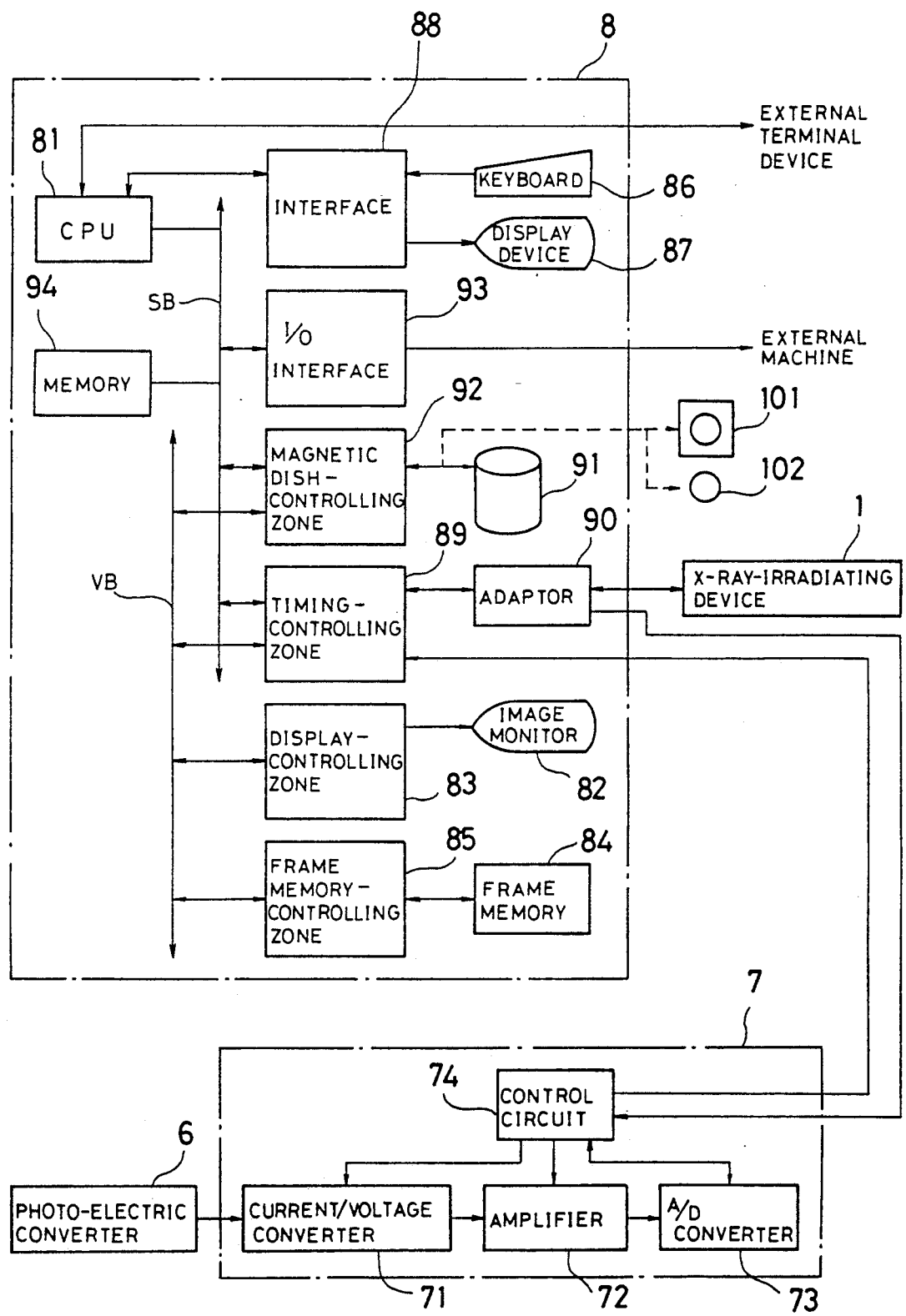
FIG. 2 is a hard ware structure diagram illustrating in detail the embodiment shown in FIG. 1.

A specific hardware structure of the image-reading device 7 is shown in FIG. 2. Namely, the image-reading device 7 comprises a current/voltage converter 71 for converting an output current of the photo-electric converter 6 to a voltage signal, and an output voltage of the current/voltage converter 71 is inputted into an A/D converter 73 through an amplifier 72. The amplifier 72 can be logarithmic amplifier. The A/D converter 73 converts an analog voltage to a digital voltage to form digital image data and outputs the digital image data to a control circuit 74. The control circuit 74 performs the gain adjustment of the current/voltage converter 71 and amplifier 72 and the input dynamic range adjustment of the A/D converter, and simultaneously, the control circuit 74 adjusts synthetically the read gain of a radiation image information and delivers image data at a predetermined timing to the image-processing device 8.

The image-processing device 8 is arranged so as to perform data input and output controls for storing the above-mentioned digital image data in a memory and outputting the digital image data for CRT display or to a film, and also to set the conditions for photographing a subject and perform the image processing described hereinafter.

As shown in FIG. 1, the image-processing device 8 comprises anatomic region-determining means 9 as the region-determining means described hereinafter, gradation processing condition-determining means 10 and gradation processing means 11.

Referring to FIG. 2 illustrating a specific structure of the image-processing device 8, a central processing unit (CPU) 81 is disposed, and an image monitor 82 is connected to CPU 81 through a display-controlling zone 83 and an image bus VB.

Furthermore, a frame memory 84 for storing image data and the like is connected to CPU 81 though a frame memory-controlling zone 85 and the image bus VB.

A keyboard 86 for inputting recognition informations (name, sex, date of birth and the like) of a subject and a display device 87 for displaying these input informations are arranged, and the keyboard 86 and display device 87 are connected to CPU 81 through an interface 88.

A timing-controlling zone 89 is disposed to output a timing control signal, and this timing-controlling zone 89 outputs the timing control signal to a driving circuit of the X-ray-irradiating device 1 through an adaptor 90 and also to the above-mentioned control circuit 73. A magnetic disk 91 is disposed to record image data, and the image data of the processed image are stored in the magnetic disk 91 by a signal from a magnetic disk-controlling zone 92. Incidentally, the image data can be recorded in an external optical disk device or magnetic tape device, as indicated by broken lines in FIG. 2.

Reference numeral 94 represents a memory for storing a control program and the like. Reference numeral 93 represents an I/O interface arranged so that the image-processing device 8 can be connected to an external machine.

In the present embodiment CPU 81 is operated according to a control program stored in the memory 94 to analyze the radiation image data stored in the frame memory 84 and determine a desired image region, and then CPU 81 determines gradation processing conditions from the data of this region and the entire radiation image is subjected to the gradation processing under the determined gradation processing conditions. Accordingly, CPU 81 constitutes anatomic region-determining means 9, gradation processing condition-determining means 10 and gradation processing means 11.

Figure 3:
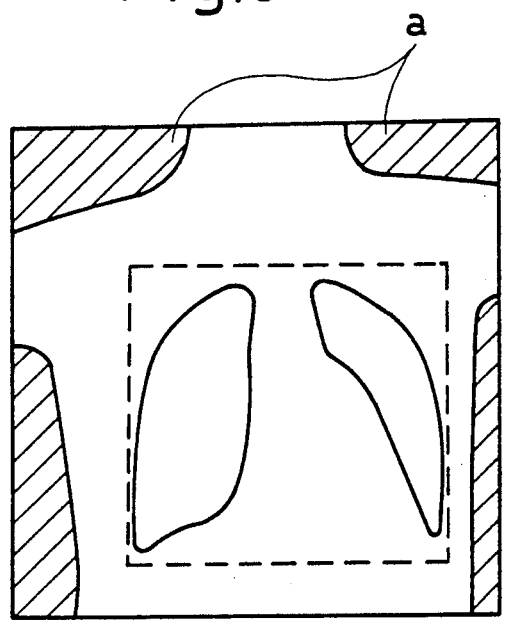
FIG. 3 is a diagram illustrating the outline of a radiation image.
Figure 4:
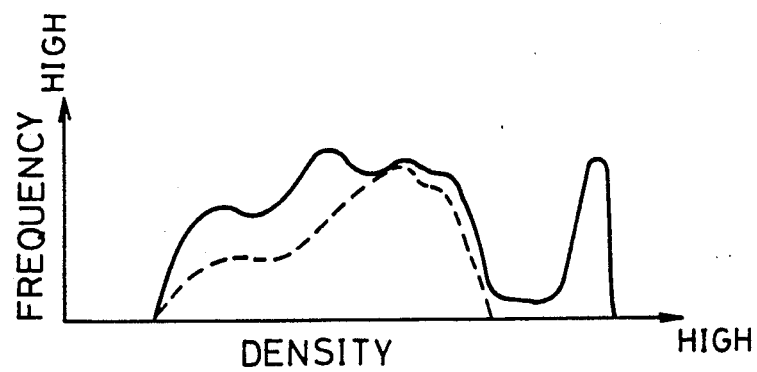
FIG. 4 is a diagram showing the histogram of the radiation image shown in FIG. 3.

In the case where the image is a chest image, portions quite unnecessary for the image data are present, as indicated by a in FIG. 3. If a histogram of the image including these unnecessary portions is formed, as indicated by the solid line in FIG. 4, the portion corresponding to the above-mentioned portions a has a great significance and exerts serious influences when the gradation processing conditions are determined from the statistic characteristics of the data of the entire image. The histogram formed by limiting the image to the pulmonary area of the chest portion (the area surrounded by the broken line in FIG. 3) is as indicated by the broken line in FIG. 4, and if the gradation processing conditions are determined only from the data of this region, optimum treatment results can be obtained.

This feature will now be described with reference to FIGS. 5A through 5C.

The photographing of the subject is first explained. When a photographing button (not shown) is depressed, the timing-controlling zone 89 drives the X-ray-irradiating device 1 through the adaptor 90 to irradiate the subject 2 with a predetermined dose of X-rays. The X-rays permeate the subject 2 and are inputted in the radiation conversion panel 3 and energy is accumulated according to the quantities of the X-rays permeating the conversion panel 3 to form a latent image of the subject 2.

When the photographing is terminated and accelerated exciting light is applied to the conversion panel 3 from the accelerated exciting light source 4, the conversion panel 3 radiates in proportion to the energy of the latent image and this radiation quantity is converted to a current signal by the photoelectric converter 6, and this current signal is inputted in the image-reading device 7. The output current is converted to digital image data and inputted into the control circuit 74 through the current/voltage converter 71, amplifier 72 and A/D converter 73 of the image-reading device 7. The digital image data are transmitted from the control circuit 74 to the frame memory 84 through the timing-controlling zone 89, image bus VB and frame memory-controlling zone 85 and are stored in the frame memory 84. CPU 81 reads the control program from the memory 94 through a system bus SB and also reads the radiation image data from the frame memory 84 through the image bus VB and frame-controlling zone 85. According to the control program, CPU 81 determines a rectangular region including the pulmonary area, indicated by the broken line in FIG. 5A, from the entire data of the front image of the chest portion where the pulmonary area is located substantially in the central portion. This determination is conducted in the following manner.

Figure 5A:
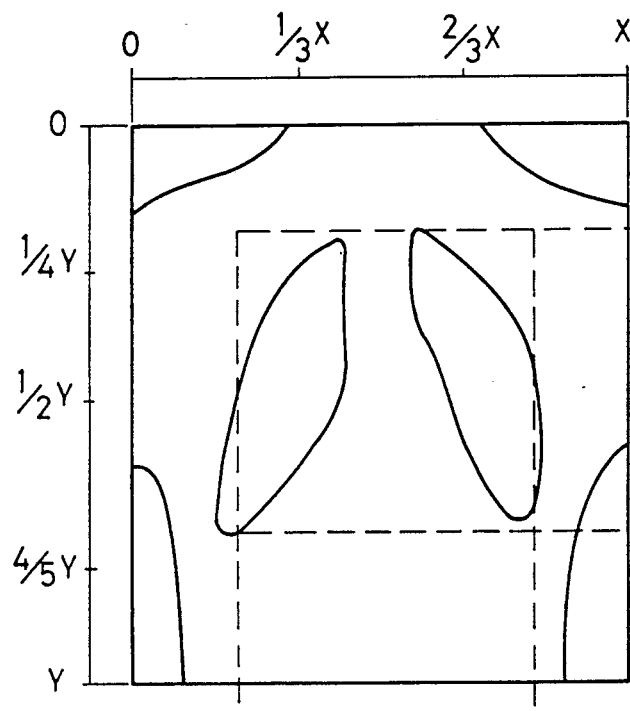
FIG. 5A is a diagram illustrating the outline of a radiation image.
Figure 5C:
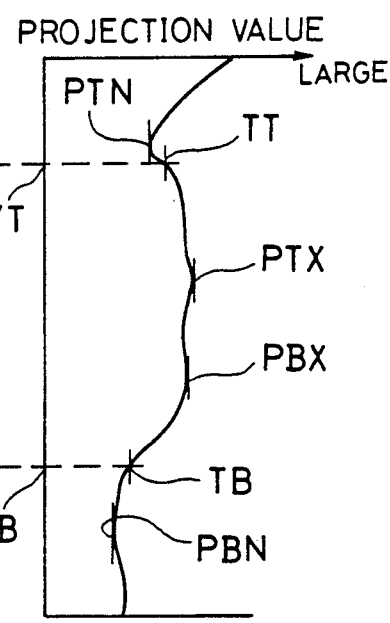
FIG. 5C is a diagram showing the lateral projection of the radiation image shown in FIG. 5A.
Figure 5B:
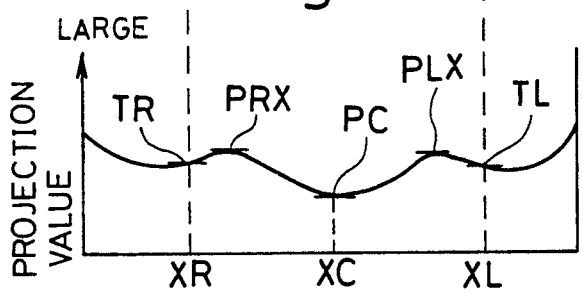
FIG. 5B is a diagram showing the longitudinal projection of the radiation image shown in FIG. 5A.

(1) At first, of the image data, the upper and lower portions of the image where the influence of the image processing is small are omitted, and the projection value (the cumulative value of the density in one direction of the image data) in the longitudinal direction of the remaining portion is determined (see FIG. 5B which shows an example where regions of about ⅓ from the top and bottom ends are omitted and the projection value of the central region of ⅓ is determined).

(2) From the obtained projection value in the longitudinal direction, the point having the minimum value PC of the projection value (density) in the column of the central region of ⅓ (the region of from ⅓X to ⅔X in FIG. 5A) is determined as the column XC of the median line.

(3) In the right and left columns of ⅓ in the entire image (the region of from 0 to ⅓X and the region of from ⅔X to X in FIG. 5A), projection values are gradually picked up from the center of the image data toward both the sides (left and right sides in FIG. 5B), and the respective projection values are compared with threshold values TR and TI described hereinafter. The points at which the projection values first become smaller than the threshold values TR and TL are determined as the left end and right end of the pulmonary area, respectively.

The threshold values TR and TL are determined from the maximum values PRX and PLX (see FIG. 5B) of the projection values in the above-mentioned range and the above-mentioned minimum value PC according to the following equations, respectively:

$$TL = [(K1-1) \times PLX + PC]/K1, \text{ and}$$

$$TR = [(K2-1) \times PRX + PC]/K2$$

wherein K1 and K2 are constants, and for example, each of K1 and K2 is set as 5 (K1=K2=5).

(4) The projection value in the lateral direction of the right pulmonary area is determined between the medial line XC and the right end (see FIG. 5C).

(5) Projection values are gradually determined from the central portion of the image data (½Y in FIG. 5A) toward the upper and lower portions in the longitudinal directions. Namely, the projection values at the respective points are determined from the data shown in FIG. 5C. In the upper portion from the center (direction O in FIG. 5A), the obtained projection values are compared with the threshold value TT described hereinafter, and the point at which the projection value first becomes smaller than the threshold value TT is determined as the top end of the right pulmonary area. In the lower portion from the center (direction Y in FIG. 5A), the obtained projection values are compared with the threshold value TB described hereinafter, and the point at which the projection value first becomes smaller than the threshold value TB is determined as the bottom end of the right pulmonary area.

The above-mentioned threshold values TT and TB are determined from the maximum values PTX and PBX of the projection values determined in the region of from ¼Y to ½Y and the region of from ½Y to 4/5Y and the minimum values PTN and PBN of the projection values determined in the directions O and Y from the maximum values according to the following equations:

$$TT = [(K3-1) \times PTX + PTN]/K3, \text{ and}$$

$$TR = [(K4-1) \times PBX + PBN]/K4$$

wherein K3 and K4 are constants, and for example, K3 and K4 are set as 10 and 6, respectively.

(6) With respect to the image data of the region of from the median line to the left end, the top end and bottom end of the left pulmonary area are determined in the same manner as described in (4) and (5) above.

(7) The determined top end of the right pulmonary area is compared with the top end of the left pulmonary area, and the top end located at an upper end is determined as the top end of the entire pulmonary area. Furthermore, the determined bottom end of the right pulmonary area is compared with the determined bottom end of the left pulmonary area, and the bottom end located at a lower position is determined as the bottom end of the entire pulmonary area.

Accordingly, these portions (1) through (7) correspond to the portion for determining the desired image region anatomically.

Thus, the region of the pulmonary area is determined as the desired image region indicated by the broken line in FIG. 5A. If the desired image region is determined based on the projection value of the image data, the analysis of the image data becomes easy, and therefore, the analysis time can be shortened. Furthermore, if the image region is determined from the projection value of the image data, even if an image error is contained in a part of the image data, this error can be reduced by data of other parts and the analysis precision can be increased.

The following method can be adopted as a different method, though the principle is the same.

Figure 6A:
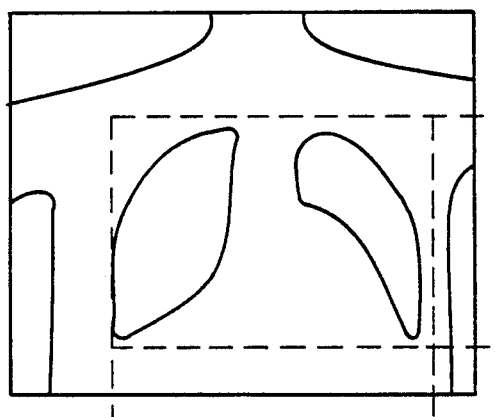
FIG. 6A is a diagram illustrating the outline of a radiation image, which is given for illustrating another operation.
Figure 6C:
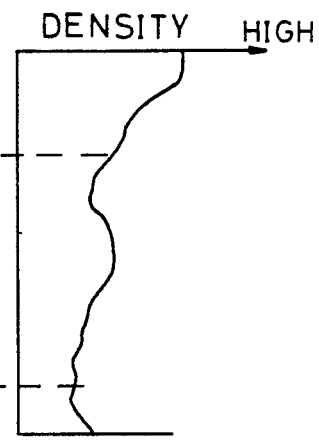
FIG. 6C is a diagram showing the lateral projection of the radiation image shown in FIG. 6A.
Figure 6B:
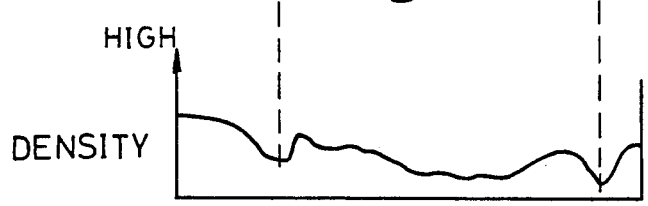
FIG. 6B is a diagram showing the longitudinal projection of the radiation image shown in FIG. 6A.

From the entire image data shown in FIG. 6A, projection values in the longitudinal and lateral directions (cumulative values of the image data in respective directions) are determined, as shown in FIGS. 6B and 6C, and the region of the pulmonary area indicated by the broken line in FIG. 6A is determined from the data in the following manner.

(1) Of the projection data shown in FIG. 6C, the upper and lower portions of the image having no substantial influences on the entire image data are omitted, and the projection values of the remaining portion in the vertical direction (in the longitudinal direction) are determined (the region surrounded by the broken line in FIG. 6C).

(2) From the projection values shown in FIG. 6B, the point of the minimum value of the density in the central portion of ⅓ is determined as the column of the median line. (3) From projection values shown in FIG. 6B, the points of the minimum values of the density in the left and right side portions of ⅓ are determined as the left and right ends of the pulmonary area, respectively.

(4) The projection values in the horizontal direction (in the lateral direction) in the range of from the median line to the right end are determined.

(5) The point of the minimum value of the projection values in the horizontal direction in the upper half of the range of the median line side is determined as the top end of the right pulmonary area, and the point of the minimum value of the projection values in the lower half of the range of the right side is determined as the bottom end of the right pulmonary area.

(6) Also with respect to the ranges of the median line side and the left end, the top end and bottom end of the pulmonary area are determined in the same manner as described in (4) and (5) above.

(7) The upper end between the so-determined top ends of the right and left pulmonary areas is designated as the top end of the entire pulmonary area, and the lower end between the bottom ends of the right and left pulmonary areas is designated as the bottom end of the entire pulmonary area.

In the case where the shapes of the right and left pulmonary areas are greatly different as in a patient using a pace maker or a one-lung patient, if the region is determined according to the above-mentioned method, an optimum image region cannot be obtained. In this case, if any one of the following treatments is carried out, bad influences by deviation of image data can be moderated, and more stable image-processing results can be obtained.

(A) In the case where at least one of the top and bottom ends of the left and right pulmonary areas is greatly different, the average of the two different positions is determined as the top end or bottom end of the pulmonary area, or of these two positions, the position on the central portion side is determined as the top end or bottom end of the pulmonary area.

(B) The effective region of the image is preliminarily restricted. Furthermore, the irradiation range is known by another means, and this range is designated as the effective region.

(C) Regions are independently determined by a plurality of methods, and the mean value of the determined regions is calculated and the determined average region is designated as the final region. Alternatively, of these regions, the region nearest to the central portion is designated as the final region.

In the foregoing embodiment, after the top and bottom ends of the left and right pulmonary areas have been determined, the top end and bottom end of the entire pulmonary area are determined. Alternatively, there can be adopted a method in which the top end and bottom end of the entire pulmonary area are simultaneously determined from the left and right pulmonary areas. In this case, the processing speed becomes high, and even if a noise or the like is included into a part of data, averaged stable results can be obtained. Furthermore, if appropriate parameters are selected according to the image, the photographing method and the photographing conditions, the image region is determined in a plurality of stages or the image region is determined while changing the projection range, stable results can be obtained according to the image, the photographing conductions and the like.

If the desired image region is thus determined, according to the control program, CPU 81 determines gradation processing conditions from the statistical characteristics of the image data of the determined region of the pulmonary area. More specifically, a cumulative histogram (statistical characteristics) of the image data of this region is formed, and the gradation processing conditions are determined so that the portions corresponding to 5% and 95% of this cumulative histogram are a minimum output signal value and a maximum output signal value. Alternatively, the portion corresponding to 50% of the cumulative histogram is set at a density of 1, while the gradation processing conditions are determined so that the portions corresponding to 5% and 95% of the cumulative histogram are a minimum output signal value and a maximum output signal value. Still further, of the image data of this region, upper and lower parts of the signal values are cut, the maximum signal value in the remaining values is adjusted to a density of about 1.9 and the gradation processing conditions are determined according to this signal value width. In this case, if the gradation processing conditions are determined from the cumulative histogram, even when an image error is present at a part of the image data, the influences can be reduced by data of other parts and the gradation processing conditions can be determined at a high precision. Accordingly, this portion corresponds to the portion for determining the gradation processing conditions from the statistical characteristics.

According to the control program, based on the so-determined gradation processing conditions, CPU 81 performs the gradation processing of the entire image to secure an image, and this image is recorded in the recording device (magnetic disk 91 or the like) and displayed on the display device (image monitor 82).

In order to shorten the calculation time or reduce the capacity of the memory, thinned-out data (for example, data obtained at every 32 picture elements) can be used as the image data for determining the gradation processing conditions. Also in this case, no substantial difference from the original image data is brought about with respect to the maximum value, the minimum value, the median value and the cumulative frequency distribution.

As is apparent from the foregoing description, since the region of the pulmonary area is determined by analyzing the entire data of the radiation image, the gradation processing conditions are determined from the statistical characteristics of the image data within this region and the radiation image is subjected to the gradation processing under the determined gradation processing conditions, optimum image data of the pulmonary area can be secured and therefore, the diagnosis performance can be enhanced.

Another embodiment where the contours of the pulmonary area are anatomically recognized will now be described with reference to FIGS. 7 and 8.

Figure 7:
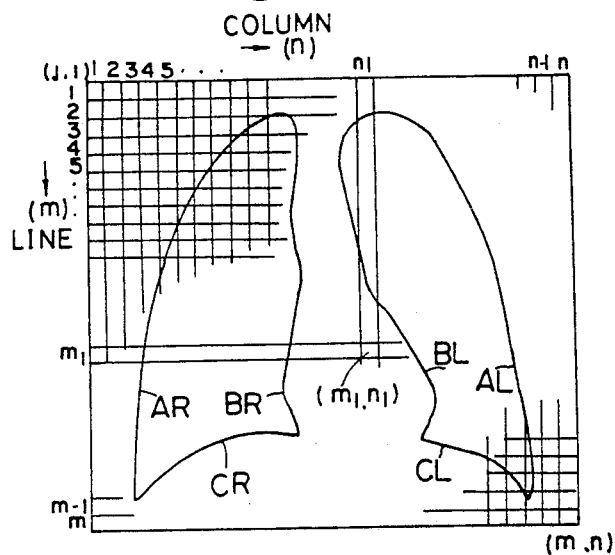
FIG. 7 is a diagram illustrating the outline of a radiation image, which is given for illustrating still another operation.

As shown in FIG. 7, the profiles of the left and right pulmonary areas are defined by outer contours AR and AL, inner contours BR and BL and phrenic contours CR and CL, respectively.

Figure 8A:
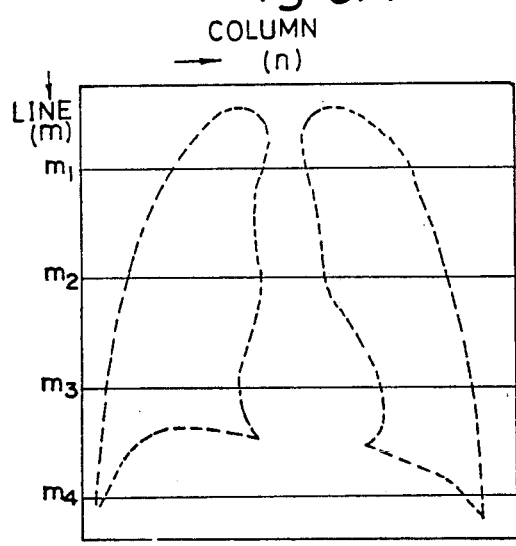
FIG. 8A is a diagram illustrating the main part of the radiation image shown in FIG. 7.
Figure 8B:
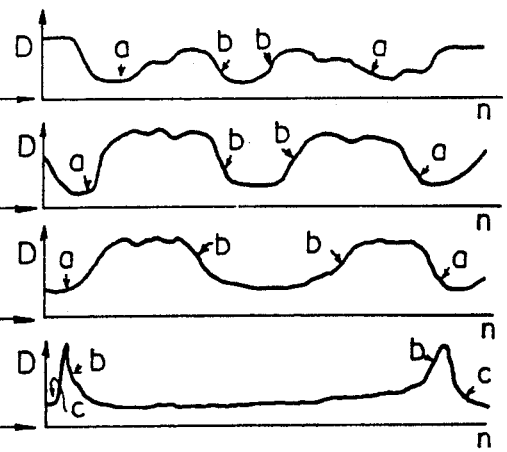
FIG. 8B is a diagram showing the distribution of the density in the lateral direction of the radiation image shown in FIG. 8A.

For recognizing these contours AR, AL, BR and BL, at first, image data of the radiation image are finely divided into m columns and n lines in the longitudinal and lateral directions, as shown in FIG. 7. The statistical quantity of the density of image data of one line in the lateral direction is determined, as shown in FIG. 8B. From so-determined values, several threshold values of the density are determined. If among the image density data (points) included within the range defined by such threshold values, the relation of a certain point to adjoining points satisfies a specific condition described hereinafter, the position of this certain point is recorded as a position of the column of the contour of the pulmonary area.

As the point satisfying the specific condition, there can be mentioned a point of the minimum value (for example, point a in FIG. 8B), a point of smallest inclination (for example, point c in FIG. 8B) and a point of largest inclination (for example, point b in FIG. 8B). Points satisfying such conditions are found out. The change of the density in the column direction of lines m1 through m4 shown in FIG. 8A is shown in FIG. 8B. Incidentally, D represents the density (percent transmission).

Furthermore, the position on the image to be analyzed, the position of of the determined point, the value of the density at the determined point, the inclination of the value of the determined point and the range of the threshold values used are synthetically judged, and it is judged what contour the determined point belongs to or whether or not the detemined point is a noise.

For example, in the case where the determined point is a point constituting the outer contour AR of the right pulmonary area, the point which is present in the range of ⅓ on the left side relatively to the image, has a value of the density smaller than the average density value (when the density is expressed by the percent transmission, the high-density portion shows a small percent transmission) and has such a relation to adjoining points that the difference is smallest or the inclination is zero, is retrieved. In this manner, with respect to each line of the image data, the positions of the points constituting the contour are determined, and the points are connected if necessary. Thus, each contour can be obtained.

The phrenic contour can be obtained by conducting the above procedures in the column direction. Thus, the contours of the entire pulmonary area can be determined.

The gradation processing conditions are determined from the statistical characteristics of the image data of the region within the so-determined contours of the pulmonary area, and the gradient of the entire image is changed. More specifically, the cumulative histogram of the image data in the region within the contours of the pulmonary area is formed, and the gradation processing conditions are determined so that the portions corresponding to 5% and 95% of this cumulative histogram are minimum output signal and maximum output signal values. Alternatively, the portion corresponding to 50% of the cumulative histogram is set at a density of 1, and the gradation processing conditions are determined so that the portions corresponding to 5% and 95% of the cumulative histogram are minimum output signal and maximum output signal values.

Still further, of the image data of this region, upper and lower parts of the signal values are cut, the maximum signal value in the remaining values is adjusted to a density of about 1.9 and the gradation processing conditions are determined according to this signal value width.

Incidentally, the image-processing device 8 can be designed so that not only the gradation processing but also other image processing, for example, correction of a distortion of the image or processing of frequency characteristics, can be performed.

As is apparent from the foregoing description, according to the present invention, entire data of a radiation image are analyzed to determine a desired image region, gradation processing conditions are determined from statistical characteristics of image data within the determined image region and the gradation processing is carried out under the determined gradation processing conditions. Accordingly, optimum image data can be secured in the desired image region, and therefore, the diagnosis performance and the like can be enhanced.

We claim:

1. A method of processing an image, comprising the steps of:

limiting an area of the image from which to obtain a gradation processing condition;

determining the gradation processing condition of the limited area; and processing the gradation of the image based upon the condition determined by the determining means, wherein the step of limiting an area of the image from which to obtain a gradation processing condition, where the image extends in lateral and longitudinal directions, comprises the sub-steps of:

obtaining projection values in the longitudinal direction for at least the central portion of the image, each projection value being the cumulative image density along a respective line oriented in the specified direction;

determining a longitudinal median location $P_c$ of one of the projection values having the least cumulative image density in the central one third of the image, said central one third being measured in the lateral direction;

establishing a longitudinally oriented line passing through the median location $P_c$ as a longitudinal median line;

comparing projection values on each side of the longitudinal line with a respective threshold projection value;

establishing a respective right and left boundary, responsive to the comparison, for each side within which said gradation processing condition is determined;

obtaining projection values in the lateral direction;

establishing a lateral median line at the midpoint of the image, said midpoint measured along a longitudinally oriented line;

identifying the minimum lateral projection value $P_{bn}$ below the lateral median line and the minimum lateral projection value above the lateral median line $P_{tn}$;

identifying the maximum lateral projection value $P_{tx}$ within the ¼ of the image above the lateral median line, as measured along the longitudinally oriented line, and the maximum lateral projection value $P_{bx}$ within the 3/10 of the image below the median line, as measured along the longitudinally oriented line;

comparing the projection values on each side of the lateral median line with a respective threshold value, wherein the upper threshold value $T_t$ and lower threshold value $T_b$ are determined using the following formulas:

$T_t = ((k3-1) \times P_{tx} + P_{tn})/k3$, and $T_b = ((k4-1) \times P_{bx} + P_{bn})/k4$, where k3 and k4 are constants; and establishing a respective upper and lower boundary, responsive to the comparison, within which said gradation processing condition is determined.

2. The method as claimed in claim 1 wherein a right threshold value $T_r$ and a left threshold value $T_l$ are established as a function of the maximum longitudinal projection value $P_{lx}$ on the left side of the longitudinal median line and the maximum threshold value $P_{rx}$ on the right side of the longitudinal median line using the following formula:

$$T_l = ((k1-1) \times P_{lx} + P_c)/k1, \text{ and}$$

$$T_r = ((k2-1) \times P_{rx} + P_c)/k2,$$

where k1 and k2 are constants.

3. A method of processing an image, comprising the steps of:
 limiting an area of the image from which to obtain a gradation processing condition;
 determining the gradation processing condition of the limited area; and
 processing the gradation image based upon the condition determined by the determining means,
 wherein the step of limiting an area from which to obtain a gradation processing condition, where the image extends in lateral and longitudinal directions, comprises the sub-steps of:
 determining projection values for at least the central portion of the image in both the longitudinal and lateral directions, each projection value being the cumulative image density along a respective line oriented in the specified direction;
 determining the minimum longitudinal projection value in the central one-third portion of the image, said central one-third being measured in the lateral direction;
 setting the longitudinally oriented line corresponding to the minimum longitudinal projection value as a longitudinal median line;
 determining the minimum longitudinal projection values respectively to the left and right side of the median line within the central one-third portion of the image;
 setting the longitudinal lines corresponding to the right and left minimum projection values as the right and left boundary for determination of the gradation processing condition;
 determining respective upper and lower minimum lateral projection values in each of the upper and lower ¼ image respectively above and below a central laterally oriented line; and
 setting lateral lines corresponding to the upper and lower minimum projection values to be respectively the upper and lower limits for determination of the gradation processing condition.

4. An apparatus for processing an image comprising:
 means for limiting an area of the image from which to obtain a gradation processing condition;
 means for determining the gradation processing condition by analyzing the limited area; and
 means for processing gradation of the image based upon the condition determined by the determining means,
 wherein the image extends in the lateral and longitudinal directions and wherein the limiting means comprises
 means for obtaining projection values in the longitudinal direction for at least the central portion of the image wherein each projection value represents the cumulative image density along a line oriented in the specified direction,
 means for determining a longitudinal median location $P_c$ of one of the projection values having the least cumulative image density in the central one-third of the image, said central one-third being measured in the lateral direction,
 means for establishing a longitudinally oriented line passing through the median location $P_c$ as a longitudinal median line,
 means for comparing the projection values on each side of the longitudinal median line with the respective threshold projection value,
 means for establishing a respective right and left boundary, responsive to the comparison, for each side within which said gradation processing condition is determined,
 means for obtaining projection values in the lateral direction,
 means for establishing a lateral median line at the midpoint of the image, said midpoint being measured along the longitudinally oriented line,
 means for identifying the minimum lateral projection value $P_{bn}$ below the lateral median line and the minimum lateral projection value above the lateral median line $P_{tn}$,
 means for identifying the maximum lateral projection value $P_{tx}$ within the ¼ of the image above the lateral median line, as measured along the longitudinally oriented line, and the maximum lateral projection value $P_{bx}$ within the 3/10 of the image below the median line, as measured in the longitudinal extent;
 means for determining an upper threshold value $T_t$ and lower threshold value $T_b$ using the formula:

$$T_t = ((k3-1) \times P_{tx} + P_{tn})/k3, \text{ and}$$

$$T_b = ((k4-1) \times P_{bx} + P_{bn})/k4,$$

wherein k3 and k4 are constants;
 means for comparing the projection values in each side of the lateral median line with the respective threshold value; and
 means for establishing a respective upper and lower boundary, responsive to the comparison, within which said gradation processing condition is determined.

5. The apparatus as claimed in claim 4, further comprising means for establishing a right threshold value $T_r$ and a left threshold value $T_l$ as a function of the maximum longitudinal projection value $P_{lx}$ on the left side of the longitudinal median line and the maximum longitudinal projection value $P_{rx}$ on the right side of the longitudinal median line according to the formula:

$$T_l = ((k1-1) \times P_{lx} + P_c)/k1, \text{ and}$$

$$T_r = ((k2-1) \times P_{rx} + P_c)/k2$$

where k1 and k2 are constants.

6. An apparatus for processing an image comprising:
 means for limiting an area of an image from which to obtain a gradation processing condition;
 means for determining the gradation processing condition by analyzing the limited area; and means for processing gradation of the image based upon the condition determined by the determining means, wherein the image extends in lateral and longitudinal directions and wherein the limiting means comprises:

means for determining projection values for at least the central portion of the image in both the longitudinal and lateral directions wherein each projection value is the cumulative image density along a respective line oriented in the specified direction;

means for determining the minimum longitudinal projection value in the central one-third portion of the image, said central one-third being measured in the lateral direction;

means for setting the longitudinally oriented line corresponding to the minimum longitudinal projection value as the longitudinal median line;

means for determining the minimum longitudinal projection values respectively to the left and right side of the median line within the central one-third portion of the image;

means for setting the longitudinal lines corresponding to the right and left minimum projection value as the right and left boundary for determination of the gradation processing condition;

means for determining respective upper and lower minimum lateral projection values in each of the upper and lower ¼ image respectively above and below a central laterally oriented line; and means for setting lateral lines corresponding to the upper and lower minimum projection values to be respectively the upper and lower limits for determination of the gradation processing condition.

* * * * *